United States Patent [19]

Hagimori

[11] Patent Number: 5,157,552
[45] Date of Patent: Oct. 20, 1992

[54] ZOOM LENS SYSTEM FOR A LIMITED CONJUGATE DISTANCE

[75] Inventor: Hitoshi Hagimori, Sakai, Japan

[73] Assignee: Minolta Camera Co., Ltd., Osaka, Japan

[21] Appl. No.: 547,973

[22] Filed: Jul. 2, 1990

[30] Foreign Application Priority Data

Jul. 4, 1989 [JP] Japan .................. 1-173241

[51] Int. Cl.$^5$ ............... G02B 15/16; G02B 15/177
[52] U.S. Cl. .......................... 359/690; 359/679; 359/681; 359/689
[58] Field of Search ............ 359/679, 681, 689, 690, 359/691

[56] References Cited

U.S. PATENT DOCUMENTS

| | | | |
|---|---|---|---|
| 4,025,167 | 5/1977 | Ikeda | 350/423 |
| 4,193,667 | 3/1980 | Yasukuni et al. | 350/423 |
| 4,592,625 | 6/1986 | Uehara et al. | 350/415 |
| 4,636,040 | 1/1987 | Tokumaru | 359/676 |

FOREIGN PATENT DOCUMENTS

| | | |
|---|---|---|
| 49-53852 | 5/1974 | Japan. |
| 53-9094 | 4/1978 | Japan. |
| 59-229518 | 12/1984 | Japan. |
| 60-120312 | 6/1986 | Japan. |

*Primary Examiner*—Scott J. Sugarman
*Attorney, Agent, or Firm*—Price, Gess & Ubell

[57] ABSTRACT

A zoom lens system for a limited conjugate distance comprises at least three lens units which can be divided into, from an object side to an image side, a front lens group having a positive refracting power and a rear lens group having a positive refracting power. An axial distance between the front lens group and the rear lens group varies by a focusing operation. A zooming operation is performed by one of the front lens group and the rear lens group including at least two lens units. The zoom lens system fulfills the condition of l=m wherein l represents an object focal length of the zoom lens system, and m represents an axial distance between an object point and an object principal point of the front lens group.

20 Claims, 10 Drawing Sheets

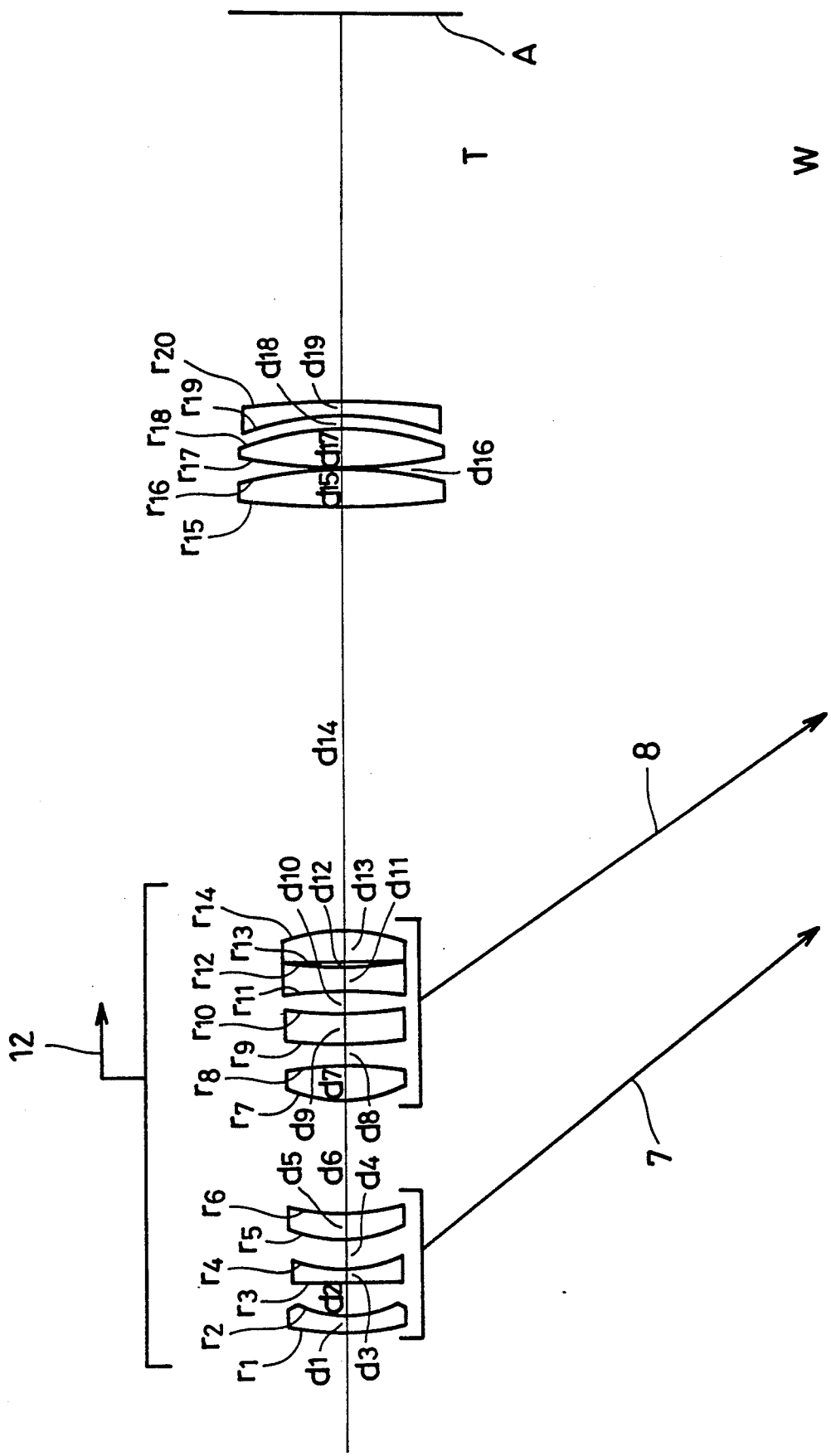

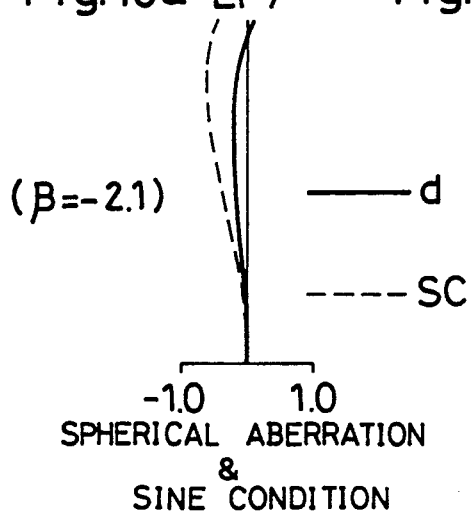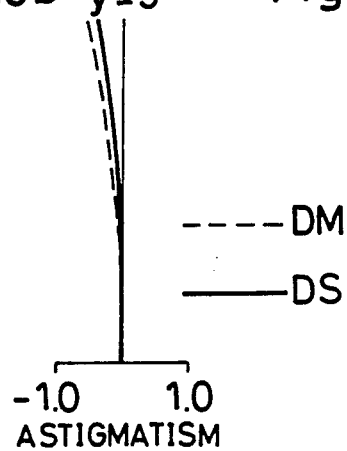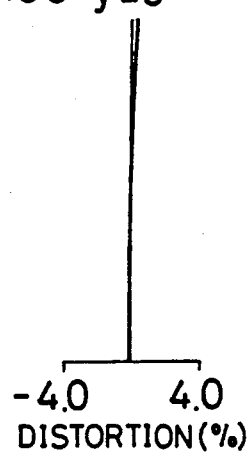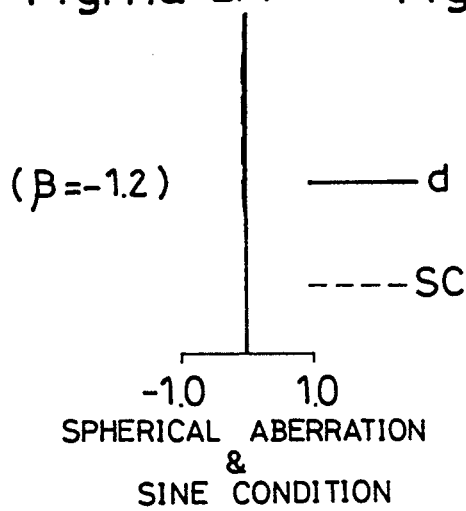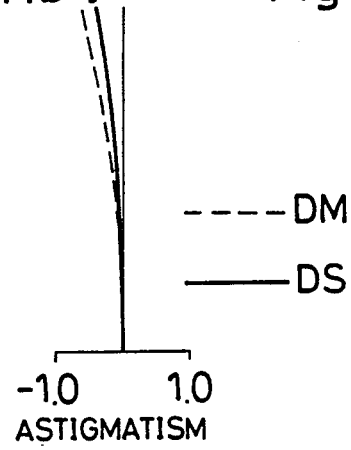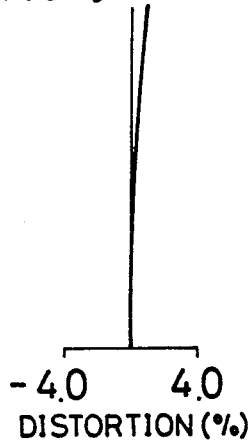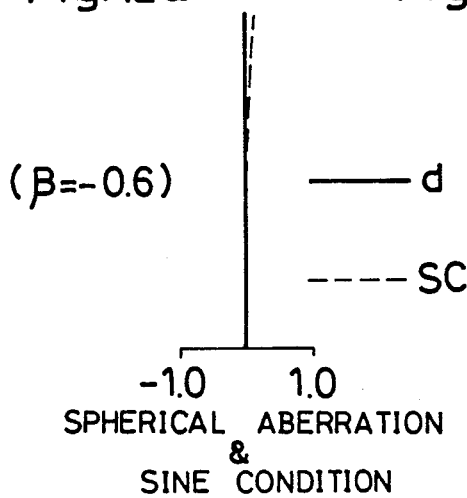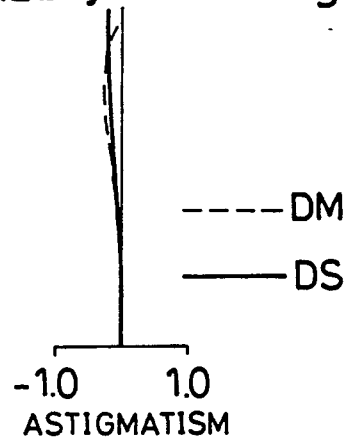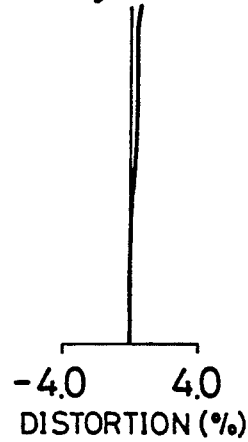

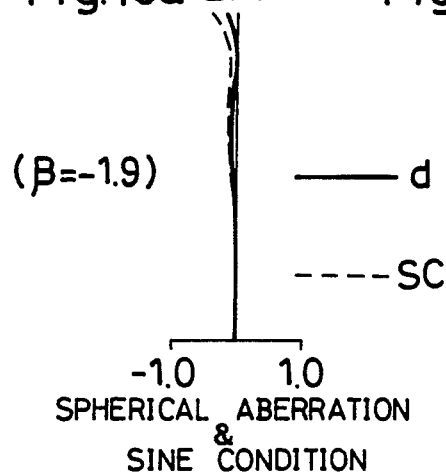
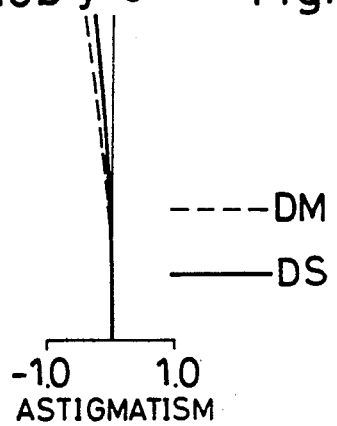
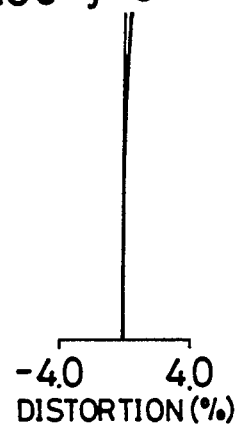
Fig.13a EF7 (β=−1.9) — d, ---- SC
-1.0 1.0 SPHERICAL ABERRATION & SINE CONDITION
Fig.13b y'=5 ---- DM, — DS
-1.0 1.0 ASTIGMATISM
Fig.13c y'=5
-4.0 4.0 DISTORTION(%)
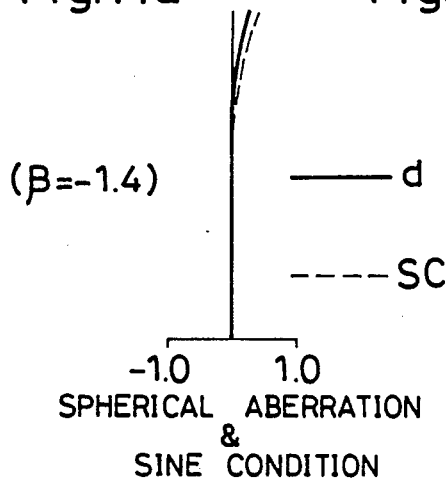
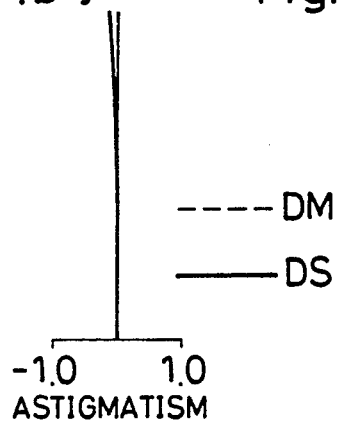
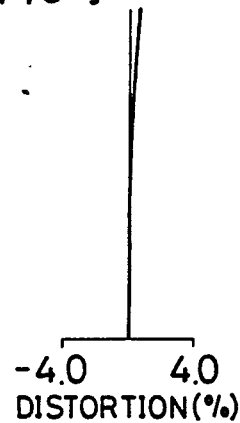
Fig.14a EF7 (β=−1.4) — d, ---- SC
-1.0 1.0 SPHERICAL ABERRATION & SINE CONDITION
Fig.14b y'=5 ---- DM, — DS
-1.0 1.0 ASTIGMATISM
Fig.14c y'=5
-4.0 4.0 DISTORTION(%)
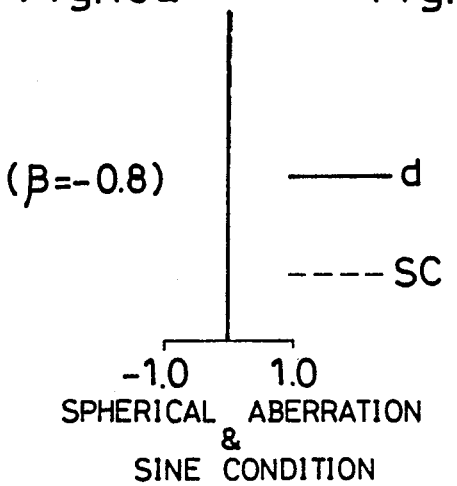
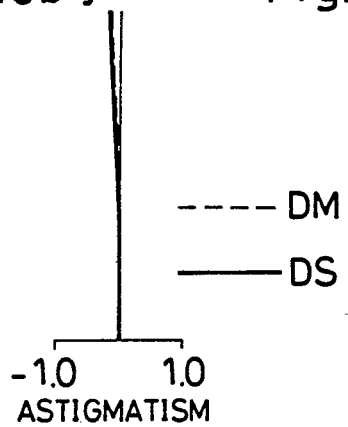
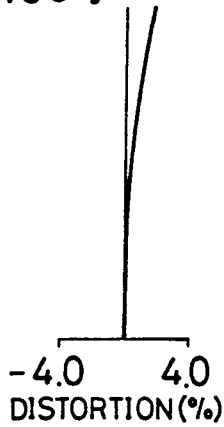
Fig.15a EF7 (β=−0.8) — d, ---- SC
-1.0 1.0 SPHERICAL ABERRATION & SINE CONDITION
Fig.15b y'=5 ---- DM, — DS
-1.0 1.0 ASTIGMATISM
Fig.15c y'=5
-4.0 4.0 DISTORTION(%)

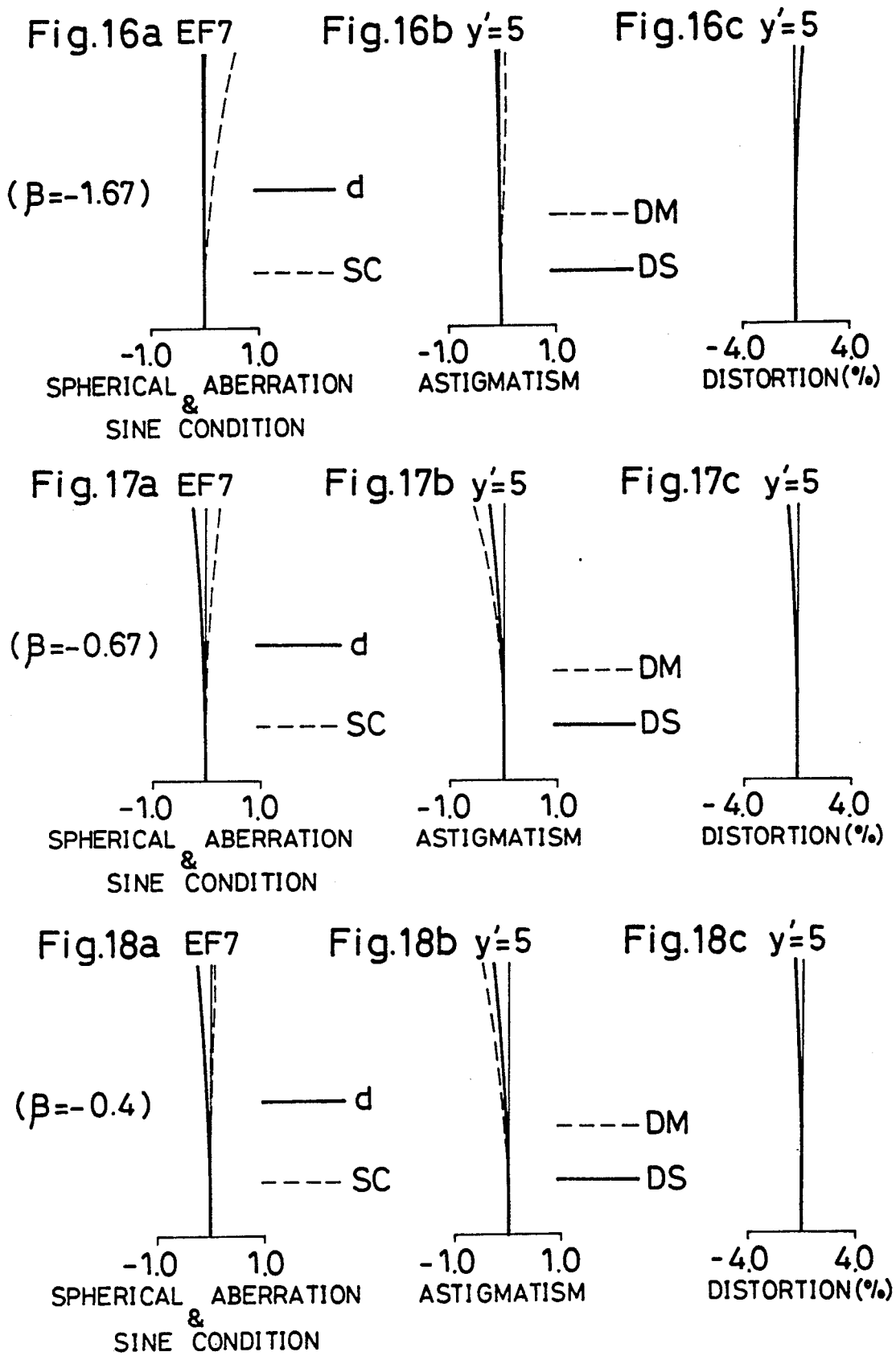

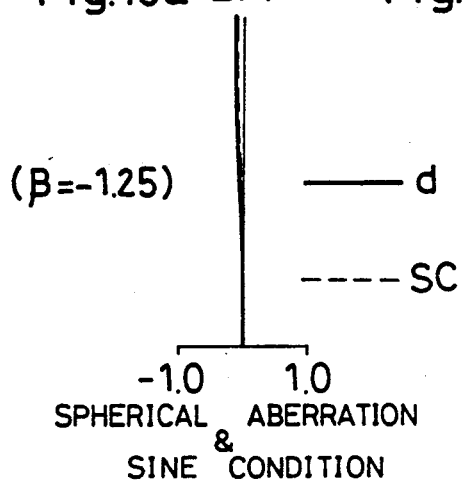
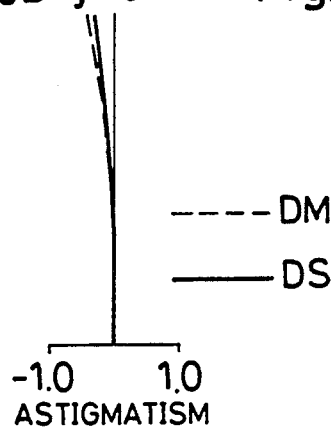
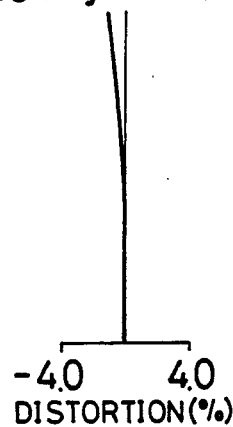
Fig.19a EF7 ($\beta=-1.25$)  
Fig.19b y'=5  
Fig.19c y'=5
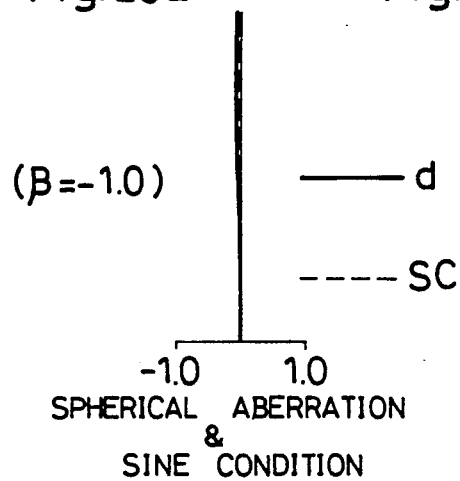
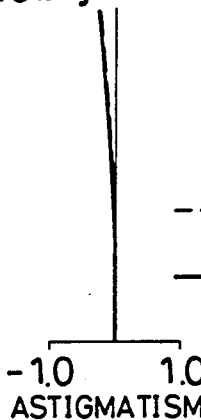
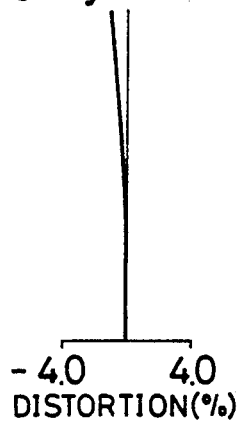
Fig.20a EF7 ($\beta=-1.0$)  
Fig.20b y'=5  
Fig.20c y'=5
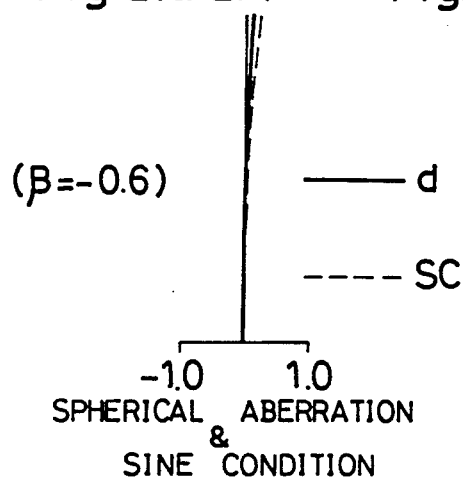
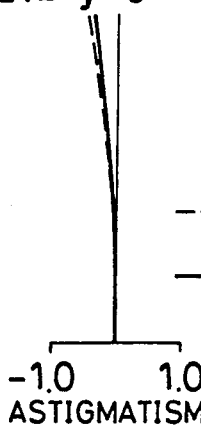
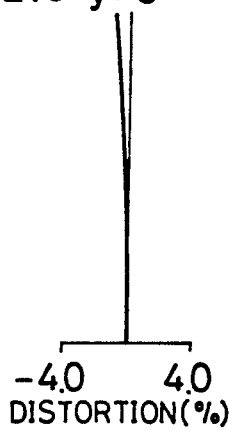
Fig.21a EF7 ($\beta=-0.6$)  
Fig.21b y'=5  
Fig.21c y'=5

ZOOM LENS SYSTEM FOR A LIMITED CONJUGATE DISTANCE

FIELD OF THE INVENTION

The present invention relates to a zoom lens system for a limited conjugate distance, especially that which can be used in an optical system of measurement apparatus for projecting an image made on a phosphorescent screen through the face plate of a CRT (Cathode Ray Tube).

PRIOR ART

The zoom lens system for limited conjugate distance is used, for example, in a copying machine. Most of such zoom lens systems are used in such a condition where: the object plane and the image plane are fixed (the distance between the planes is kept constant), and the magnification of the image is changed by moving a movable lens group with some other necessary movements within the lens system. Some zoom lens systems for a limited conjugate distance are used with the conjugate distance changed, but in this case, the conjugate distance depends on the magnification.

In general zoom lens systems for an SLR camera having an afocal lens system, a conjugate distance changes and hence the magnification also changes as a focusing operation is performed (cf., Japanese Published Examined Patent Applications S55-41402 and S53-9094, and Unexamined Patent Applications S59-229518 and S49-53582).

As for a lens system whose magnification is especially important (e.g., a lens system used in a measurement apparatus), such focusing system that the magnification changes with the focusing operation is not acceptable. For example, in an optical system of a measurement apparatus for measuring an image on a phosphorescent screen projected through the face plate of a CRT, the magnification of the optical system should be kept constant all the time. This measurement apparatus is used in such a manner that a lens-barrel of the optical system is put on the face plate of the CRT and its object lens confronts the face plate. But the thickness of the face plate is different depending on a vaviety of CRT model. Even on the same CRT, the face plate thickness vavies depending on respective measured spots, or at different places of a CRT screen.

Therefore, re-focusing is required every measurements.

This is the reason why an optical system is required in which the magnification does not change during a focusing operation.

A lens system is already known (as described in the Japanese published Unexamined Patent Application S58-150924) in which two lens groups arranged so that a luminous flux therebetween become parallel pencil of rays and a conjugate distance is changed by changing a distance between the two lens groups. But this lens system cannot be used as a zoom lens because it does not constitute a variable magnification system.

An afocal zoom lens system has been proposed (as described in the Japanese Published Unexamined Patent Application S60-120312) in which an objective lens and an image forming lens are added respectively on the object side and image side of an afocal lens comprising three lens units. The afocal zoom lens system is used in a microscope. A zooming operation is achieved within the three lens units of the afocal lens. The afocal lens plus the objective lens and the image forming lens tolals up five lens units, the afocal zoom lens system is not compact in size.

Another lens system (as described in Japanese Published Unexamined Patent Application S54-39144) is proposed that a magnification is kept constant during a focusing operation by shifting both a variator lens unit and a compensator lens unit. But the magnification can be kept constant only at a when the magnification is within a predetermined range. When the magnification is out of the range, the magnification changes during the focusing operation.

SUMMARY OF THE INVENTION

An object of the present invention is to provide a zoom lens system for a limited conjugate distance which maintains a conjugate relation between an object and its image even when the conjugate distance between the ojbect and the image varies.

Another object of the present invention is to provide a zoom lens system for a limited conjugate distance in which a magnification is variable in a zooming operation but a magnification is kept constant during a focusing operation required by a conjugate distance change.

In accordance with a typical feature of the present invention, a zoom lens system for a limited conjugate distance comprises at least three lens units which can be divided into, from a object side to a image side, a front lens group having a positive refracting power and the rear lens group having a positive refracting power.

An axial distance between the front lens group and the rear lens group varies for focusing operation, and a zooming operation is performed by one of the front lens group or the rear lens group including at least two lens units. Also, a condition $l = m$ is fulfilled, wherein $l$ represents an object focal length of the zoom lens system, and $m$ represents an axial distance between an object point and an object principal point of the front lens group.

According to the feature, the magnification is kept constant during a focusing operation required by a conjugate distance change.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

BRIEF DESCRIPTION OF THE DRAWINGS

FIG. 9 shows a cross sectional view of a zoom lens system according to the fourth embodiment of the present invention;

FIGS. 10a to 10c show the aberration curves of the first embodiment at the magnification $\beta = -2.1$;

FIGS. 11a to 11c show the aberration curves of the first embodiment at the magnification $\beta = -1.2$;

FIGS. 12a to 12c show the aberration curves of the first embodiment at the magnification $\beta = -0.6$;

FIGS. 13a to 13c show the aberration carves of the second embodiment at the magnification $\beta = -1.9$;

FIGS. 14a to 14c show the aberration carves of the second embodiment at the magnification $\beta = -1.4$;

FIGS. 15a to 15c show the aberration curves of the second embodiments at the magnification $\beta = -0.8$;

FIGS. 16a to 16c show the aberration curves of the third embodiment at the magnification $\beta = -1.67$;

FIGS. 17a to 17c show the aberration curves of the third embodiment at the magnification $\beta = -0.67$;

FIGS. 18a to 18c show the aberration curves of the third embodiment at the magnification $\beta = -0.4$;

FIGS. 19a to 19c show the aberration curves of the fourth embodiment at the magnification $\beta = -1.25$;

FIGS. 20a to 20c show the aberration curves of the fourth embodiment at the magnification $\beta = -1.0$;

FIGS. 21a to 21c show the aberration curves of the fourth embodiment at the magnification $\beta = -0.6$.

DETAILED DESCRIPTION OF PREFERRED EMBODIMENTS

Figure 1A:
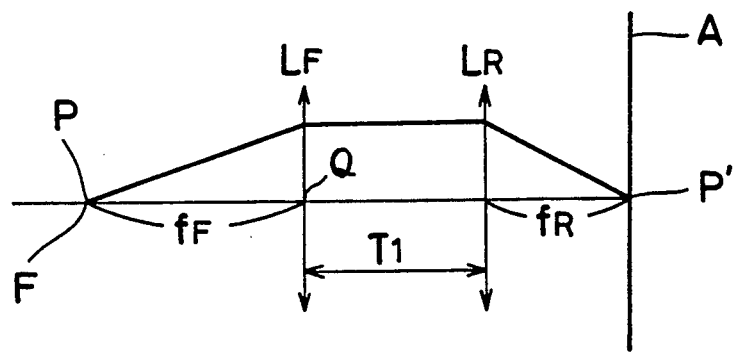
FIGS. 1a and 1b show a basic arrangement of refracting power according to the present invention.
Figure 1B:
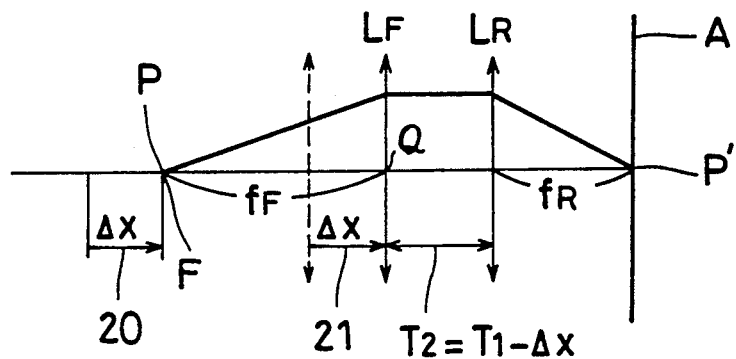

FIGS. 1(a) and 1(b) show a basic arrangement of refracting power according to the present invention. Since an object point P is positioned at an object focal point F of a front lens group $L_F$, an axial luminous flux projected from the front lens group $L_F$ is substantially parallel with an optical axis. The axial luminous flux is passed through a rear lens group $L_R$ to converge into an image at an image point P' on an image surface A. In this case, a magnification $\beta$ of the entire lens system is given by:

$$\beta = -\frac{f_R}{f_F} \quad (1)$$

wherein $f_F$ represents a focal length of the front lens group $L_F$, and $f_R$ represents a focal length of the rear lens group $L_R$. If the object point P is shifted toward the image point P' side by a distance $\Delta X$ as shown by an arrow 20 in FIG. 1(b), a focusing operation is performed again by shifting the front lens group $L_F$ toward the image point P' by a distance $\Delta X$ as shown by an arrow 21 in FIG. 1(b). Accordingly, if a distance between the front lens group $L_F$ and the rear lens group $L_R$ prior to a re-focusing operation is set as $T_1$ (refer to FIG. 1(a)), a distance $T_2$ between the front lens group $L_F$ and the rear lens group $L_R$ after the re-focusing operation is represented as $(T_1 - \Delta X)$. In FIG. 1(b), the dash line shows an arrangement of the front lens group $L_F$ in FIG. 1(a), while the arrow 21 shows that the front lens group $L_F$ is shifted by the distance $\Delta X$ same as the shifting amount of the object point P.

The focusing operation is performed in such a manner that the front lens group $L_F$ is so moved as to make the object focal point F coincide with the object point P. In other word, the zoom lens system fulfills the following condition:

$$l = m \quad (2)$$

wherein l represents an object focal length of the zoom lens system and m represents an axial distance between the object point P and an object principal point Q of the front lens group $L_F$. The axial luminous flux is afocal between the front and rear lens groups $L_F$ and $L_R$, resulting the object focal length l of the zoom lens system equals the focal length $f_F$ of the front lens group $L_F$. Therefore, the magnification $\beta$ after the focusing operation is represented as the equation (1) in either case, that is, the magnification $\beta$ is constant even if the focusing operation is performed again and the distance between the front and rear lens groups is changed.

Whereas, a zooming operation according to the present invention is performed in such a manner that either the front lens group $L_F$ or the rear lens group $L_R$ works as a zooming lens group, which must be constituted with at least two lens units.

Hereinafter, firstly, an explanation will be made of cases where the zooming operation is performed by using the rear lens group $L_R$. The front lens group $L_F$ including a first lens unit having a positive refracting power, and the rear lens group $L_R$ including a second lens unit and a third lens unit, one of the second and third lens units having a positive refracting power and the other having a negative refracting power.

Figure 2:
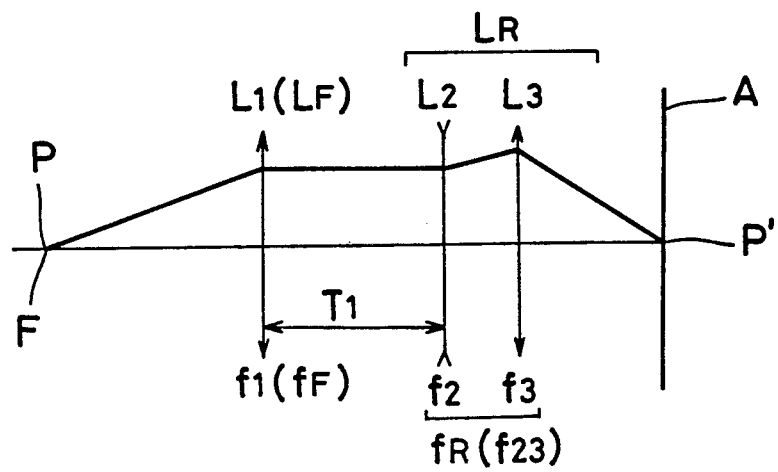
FIG. 2 shows an arrangement of refracting power of a zoom lens system for a limited conjugate distance according to a first embodiment of the present invention.

FIG. 2 shows an arrangement of refracting power of a zoom lens system for a limited conjugate distance according to a first embodiment, in which, from an object side to an image side a first lens unit $L_1$, a second lens unit $L_2$ and a third lens unit $L_3$ have respectively positive, negative and positive refracting powers.

As shown in FIG. 2, the focusing operation is performed as follows: the distance $T_1$ between the first lens component $L_1$ and the second lens component $L_2$ is varied so that the object point P may coincide with the object focal point F of the first lens component $L_1$ with a focal length $f_1$, which is applied for the front lens group $L_F$ with a focal length $f_F$. Thereby, an axial luminous flux projected from the first lens component $L_1$ is passed through the second lens component $L_2$ in substantially parallel with the optical axis. In this case, the zooming operation is performed by varying the distance between the second lens component $L_2$ and the third lens component $L_3$. Thus, once a magnification is determined by the zooming operation, and then a re-focusing operation is performed to correct an out-of-focus condition caused by the zooming operation, the magnification is kept constant during the focusing operation.

In addition, since the rear lens group $L_R$ includes the second lens unit $L_2$ and the third lens unit $L_3$, the focal length $f_R$ of the rear lens group $L_R$ is varied in response to a change of the distance between the second lens unit $L_2$ and the third lens unit $L_3$. That is, due to the change of the focal length $f_R$, the magnification $\beta$ of the entire lens system is varied according to the equation (1).

Further, it is necessary to design a cam slot so as to keep the image point P' immobile irrespective of the movements of the second lens unit $L_2$ and the third lens unit $L_3$.

In order to realize a zoom lens system with a compact size and satisfactory performance, an interference between respective lens units and a fluctuation of various aberrations due to the zooming operation are inappropriate. It is preferable, to solve the problems, to fulfill the following conditions:

$$-2.5 \leq \beta \leq -0.6 \tag{3}$$

$$-1.2 \leq \frac{f_2}{\sqrt{f_{23H} \cdot f_{23L}}} \leq -0.8 \tag{4}$$

wherein the reference symbols are defined as follows:
  $\beta$: a magnification of the entire zoom lens system
  $f_2$: a focal length of the second lens unit $L_2$
  $f_{23H}$: a compound focal length of the second and the third lens units $L_2$ and $L_3$ at a maximum magnification
  $f_{23L}$: a compound focal length of the second and the third lens units $L_2$ and $L_3$ at a minimum magnification.

The magnification $\beta$ of the entire zoom lens system in the first embodiment is described from the equation (1):

$$\beta = -\frac{f_{23}}{f_1}$$

Accordingly, if the magnification $\beta$ exceeds the lower limit of the condition (3), the compound focal length $f_{23}$ is too lengthened relative to the focal length $f_1$ of the first lens unit $L_1$. When a conversion axial distance between the second lens unit $L_2$ and the third lens unit $l_3$ is represented as (e), the following equation is established:

$$e = f_2 + f_3 - \frac{f_2 f_3}{f_{23}} \tag{5}$$

$$(f_2 < 0, f_3 > 0, f_{23} > 0)$$

wherein $f_3$ represents a focal length of the third lens unit $L_3$.

As is apparent from the above-described equation (5), the larger the compound focal length $f_{23}$ becomes, the smaller the conversion axial distance e becomes. As a result, at a higher magnification, it is liable to occur an interference between the second lens unit $L_2$ and the third lens unit $L_3$. On the other hand, if the magnification $\beta$ exceeds the upper limit of the condition (3), the compound focal length $f_{23}$ becomes smaller relative to the focal length $f_1$ of the first lens unit $L_1$. As a result, the conversion axial distance e is lengthened as shown in the equation (5), whereby at a lower magnification, an interference is liable to occur between the first lens unit $L_1$ and the second lens unit $L_2$. In order to prevent such an interference, respective distance between respective lens units must be broadened, resulting in the contrary of compactness of the entire lens system.

The focusing operation is performed by varying the distance $T_1$ between the first lens unit $L_1$ and the second lens unit $L_2$ as described above. Therefore, when the distance $T_1$ is narrowed, a range in which the focusing function can be effected is undesirably limited. Here, it should be noted that the range means the space in which the first lens unit $L_1$ shifts so as to make the object focal point P coincide with the object focal point F. Accordingly, it is preferable to set the magnification of the lens system according to the present embodiment as from $-2.5$ to $-0.6$.

The condition (4) is for defining the shifting of the second lens unit $L_2$ and the third lens unit $L_3$. If the lower limit of the condition (4) is exceeded, at a lower magnification, the first lens unit $L_1$ and the second lens unit $L_2$ are liable to interfare with each other. On the contrary, if the upper limit of the condition (4) is exceeded, at a higher magnification, the second lens unit $L_2$ and the third lens unit $L_3$ are liable to interfere with each other.

Further, if the following equation (6) is fulfilled, at the minimum magnification after a zooming operation, the second lens unit $L_2$ returns to an original position where the second lens unit $L_2$ was placed at the maximum magnification.

$$\frac{f_2}{\sqrt{f_{23H} \cdot f_{23L}}} = -1 \tag{6}$$

If the equation (6) is fulfilled, accordingly, a compact lens system having a larger focusing range can be realized. In addition, from the viewpoint of correcting various aberrations, it is required to make the shifting amount of the lens units as small as possible. Therefore, if the upper limit or the lower limit of the condition (4) is exceeded, it is difficult to correct aberrations because the shifting amount of the lens units becomes to large.

Furthermore, a zoom lens system for a limited conjugate distance with more satisfactory performance will be realized, if the zoom lens system according to the first embodiment further fulfills the following conditions:

The zoom lens system is constituted with, from the object side, the first lens unit $L_1$ having a positive refracting power consisting of three lens elements, at least one lens element is a negative lens; the second lens unit $L_2$ having a negative refracting power consisting of a negative bi-concave lens and a positive lens; and the third lens unit $L_3$ having a positive refracting power consisting of four lens elements, one of the four lens elements is a negative meniscus lens. Additionally, the following conditions (7) and (8) should be fulfilled:

$$0.25 \leq r_q/r_p \leq 0.35 \tag{7}$$

$$3.0 \leq \frac{r_S + r_T}{r_S - r_T} \leq 4.0 \tag{8}$$

wherein the reference symbols are defined as follows:
  $r_p$: a radius of curvature of an object-side surface of the negative lens included in the first lens unit $L_1$
  $r_q$: a radius of curvature of an image-side surface of the negative lens included in the first lens unit $L_1$
  $r_S$: a radius of curvature of an object-side surface of the negative meniscus lens included in the third lens unit $L_3$ $r_T$: a radius of curvature of an image-side surface of the negative meniscus lens included in the third lens unit $L_3$ When the zoom lens system is applied to an optical system for a measurement apparatus in which it is indispensable to maintain a magnification constant, the generation of a distortion and a lateral chromatic aberration must be suppressed. If the distortion is generated, an error of the magnification is produced dependent on a image height. On the other hand, if the lateral chromatic aberration is generated, an error of the magnification is produced dependent on a wavelength.

Accordingly, the generation of the distortion and the lateral chromatic aberration must be suppressed to the utmost.

If $r_q/r_p$ exceeds the lower limit of the condition (7) relating to the distortion, an optical performance of the entire zoom lens system is deteriorated because a lateral chromatic aberration is generated rather than the distortion. On the contrary, if $r_q/r_p$ exceeds the upper limit of the condition (7), a positive distortion is largely generated. Concerning the condition (8) relating to the lateral chromatic aberration and a spherical aberration, if the lower limit is exceeded, a positive lateral chromatic aberration and a positive spherical aberration are largely generated. If the upper limit of the condition (8) is exceeded, a negative lateral chromatic aberration and a negative spherical aberration is largely generated. Therefore, it is difficult to satisfactorily correct aberrations unless the conditions (7) and (8) are fulfilled.

Figure 3:
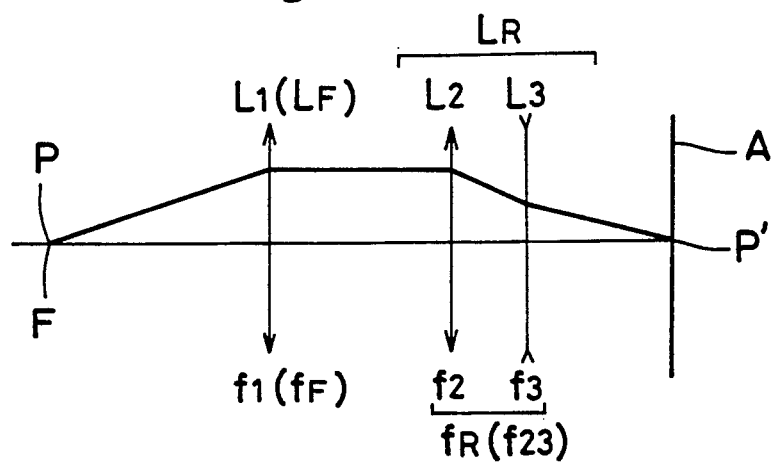
FIG. 3 shows an arrangement of refracting power of a zoom lens system for a limited conjugate distance according to a second embodiment of the present invention.

FIG. 3 shows an arrangement of refracting power of a zoom lens system for a limited conjugate distance according to a second embodiment, in which the zooming operation is performed by using the rear lens group $L_R$ as similarly to the first embodiment. The zoom lens system is constituted with, from the object side, the first lens unit $L_1$ having a positive refracting power, the second lens unit $L_2$ having a positive refracting power and the third lens unit $L_3$ having a negative refracting power.

As shown in FIG. 3, the focusing operation is performed in such a manner that the distance between the first lens component $L_1$ and the second lens component $L_2$ is varied so as to make the object point P coincide with the object focal point F of the first lens unit $L_1$, whereby a luminous flux projected from the first lens unit $L_1$ is substantially parallel with the optical axis. Whereas, the zooming operation is performed by varying the distance between the second lens unit $L_2$ and the third lens unit $L_3$. Accordingly, once a magnification is determined by the zooming operation, the magnification is maintained constant while the re-focusing operation is performed due to the movement of the object point P.

Further, when the distance between the second lens unit $L_2$ and the third lens unit $L_3$ of the rear lens group $L_R$ is varied, the magnification of the entire zoom lens system is changed from the equation (1) because the focal length $f_R$ of the rear lens group $L_R$ changes. In addition, it is necessary to design a cam slot of a lens barrel so as to maintain the image point P' immobile.

When the lens system according to the second embodiment is designed so as to fulfill the following further conditions (9) and (10), a further satisfactory zoom lens system with desirable performance are obtained, in which interference between the respective lens units and a fluctcation of various aberrations due to a zooming operation are suppressed:

$$1.2 \leq \frac{f_{23L}}{f_2} \leq 1.6 \quad (9)$$

$$-1.9 \leq \beta \leq -0.8 \quad (10)$$

The condition (9) defines a lens back by its lower limit, and the refractive powers of the second lens unit $L_2$ and the third lens unit $L_3$ by its upper limit. Here, it should be noted that the lens back means a distance between the utmost image-side surface of the third lens unit $L_3$ and the image surface A. When the lens back is represented as L. B., the following equation (11) is established:

$$L.B. = f_3 \left(1 - \frac{f_{23}}{f_2}\right) \quad (11)$$

$(f_2 > 0, f_3 < 0)$

Since the lens back (L. B.) is made smaller in linear proportion to reduction of the magnification (as the compound focal length $f_{23}$ is shortened), a condition for defining the lens back as L. B. $>0$ is as follows:

$$1 < \frac{f_{23L}}{f_2} \quad (12)$$

However, not only the lens back should be a positive value but also required to have a adequate range.

The lower limit of the condition (9) is defined as 1.2 for this reason. If the upper limit of the condition (9) is exceeded, the focal lengths $f_2$ and $f_3$ relative to the compound focal length $f_{23}$ become smaller though the lens back (L. B.) at the minimum magnification is sufficient. That is, the refracting powers of the second lens unit $L_2$ and the third lens unit $L_3$ are increased, whereby correcting aberrations is made difficult.

Concerning the condition (10), if the magnification $\beta$ exceeds the lower limit thereof, the lens back (L. B.) is lengthened. However, the axial distance between the second lens unit $L_2$ and the third lens unit $L_3$ is narrowed, whereby an interference is liable to occur therebetween.

By enlarging the axial distance between the second lens unit $L_2$ and the third lens unit $L_3$ at the higher magnification, it is possible to avoid the interference. However, the enlargement of the axial distance causes the lens back smaller so that an adequate magnification ratio will not be realized at the lower magnification side.

On the other hand, if the magnification $\beta$ exceeds the upper limit of the condition (10), the lens back will be smaller, but the lens back is restricted according to the condition (9) to determine the possible minimum magnification 0.8.

Furthermore, a zoom lens system for a limited conjugate distance with more satisfactory performance will be realized, if the lens system further fullfills the following conditions:

The zoom lens system is constituted with the first lens unit $L_1$ having a positive refracting power consisting of three lens elements, at least one lens element of which is a negative lens; the second lens unit $L_2$ having a negative refracting power consisting of four lens elements; and the third lens unit $L_3$ having a negative refracting power consisting of three lens elements, one of the three lens elements is a positive meniscus lens. Additionally, the following condition (13) and (14) should be fulfilled:

$$0.25 \leq \frac{r_q}{r_p} \leq 0.35 \quad (13)$$

$$2.5 \leq \frac{r_S + r_T}{r_S - r_T} \leq 4.5 \quad (14)$$

wherein
$r_S$: a radius of curvature of an object-side surface of the negative meniscus lens included in the third lens unit
$r_T$: a vadius of curvature of an image-side surface of the negative meniscus lens include in the third lens unit The condition (13) relates to a distortion. If $r_q/r_p$ exceeds the lower limit, optical performance of the entire zoom lens system is deteriorated because a lateral chromatic aberration is generated rather than the distortion. On the contrary, if $r_q/r_p$ exceeds the upper limit, a positive distortion is largely generated. Optical system in which magnification is regarded as important is required to satisfy the condition (13). Concerning the condition (14) relating to a spherical aberration, if the lower limit thereof is exceeded, a negative spherical aberration is largely generated. On the contrary, the upper limit thereof is exceeded, a positive spherical aberration is largely generated. It is therefore difficult to satisfactorily correct aberrations.

The above-mentioned embodiments includes a front lens group $L_F$ comprising one lens unit $L_1$ having a positive refracting power and a rear lens group $L_R$ comprising two lens units $L_2$ and $L_3$ having an refracting power opposite from each other. And, especially two kinds of the optical systems have been described. In one system, the rear lens group $L_R$ for magnification comprises, from the object side to the image side, the negative lens unit $L_2$ and the positive lens unit $L_3$. In the other system, the rear lens group $L_R$ for magnification comprises, from the object side to the image side, the positive lens unit $L_2$ and the negative lens unit $L_3$.

The description of the difference of a total length of the zoom lens system and compensation of aberrations between these two systems will be subsequently given.

The former where the rear lens group $L_R$ comprises, the positive lens unit $L_2$ and the negative lens unit $L_3$, the total size of the optical system will be compact in size because the lens back can be shortened. However, it is not possible to use the zoom lens system at the lower magnification because the lens back becomes too short at the lower magnification. This means that a large magnification ratio is not realized. Moreover, compared with the latter where the rear lens group $L_R$ comprises the negative unit and the positive lens unit, the height of light passing through the second lens unit $L_2$ is liable to be higher, and therefore, it becomes difficult to satisfactorily correct aberrations.

On the other hand, the latter where the rear lens group $L_R$ comprises, the negative lens unit $L_2$ and the positive lens unit $L_3$, the lens back is lengthened and the compactness in size is not realized. However, it is possible to realize the large magnification ratio and to compensate aberrations caused by the zooming operation if the system is free from a restriction of the lens back.

In the implementations described above, the front lens group $L_F$ comprises a first lens component $L_1$ having a positive refractive power, and the rear lens group $L_R$ comprises the second lens component $L_2$ and the third lens component $L_3$ having refractive power signs of which are different each other.

On the contrary, the arrangements where the front and rear lens group is inverted in the aforementioned optical lens system may be effective for establishing the same performance. The optical system includes the front lens group $L_F$ comprising the first lens unit $L_1$ and the second lens unit $L_2$, one of the first and second lens units having a positive refracting power and the other having a negative refracting power, and the rear lens group $L_R$ comprising the third lens unit $L_3$ having a positive refracting power. In this type of zoom lens system, a magnification operation is performed by the front lens group $L_F$.

Figure 4:
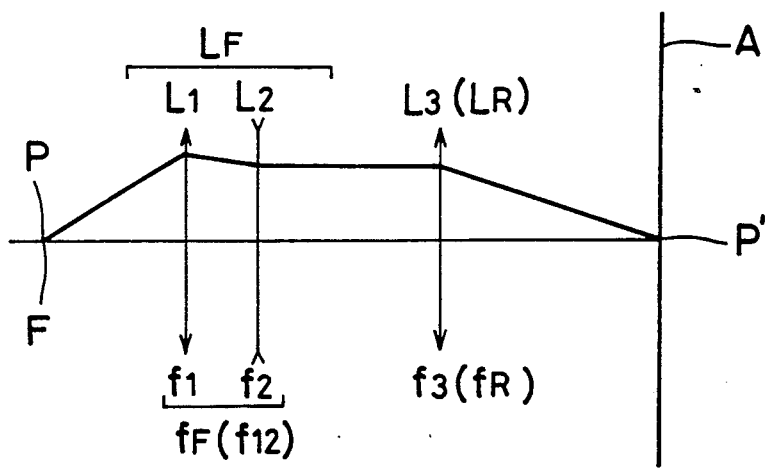
FIG. 4 shows an arrangement of refracting power of a zoom lens system for a limited conjugate distance according to a third embodiment of the present invention.

As a third embodiment of a zoom lens system for a limited conjugate distance is shown in FIG. 4 which comprises, from the object side to the image side, a first lens unit $L_1$ of a positive refracting power, a second lens unit $L_2$ of a negative refracting power and a third lens unit $L_3$ of a positive lens unit. In this arrangement, a focusing operation is performed by varying an axial distance between the second lens unit $L_2$ and the third lens unit $L_3$ in the manner that the object point P is so positioned at a front side focal point P of the front lens group $L_F$ as shown in FIG. 4. On the other hand, a zooming operation is performed by varying an axial distance between the first lens unit $L_1$ and the second lens unit $L_2$. Accordingly, the distance between the first lens unit $L_1$ and the second lens unit $L_2$ is not changed during the focusing operation, the magnification is maintained constant. As will be understood from the arrangement of refracting power shown in FIG. 4, the image point P' on the image surface A and the object point P of the optical system of FIG. 4 are interchanged with respect to the refracting power arrangement compared to the zoom lens system in FIG. 2.

The focal length $f_F$ of the front lens group $L_F$ changes if the distance between the first lens unit $L_1$ and the second lens unit $L_2$ is varied because the front lens group $L_F$ comprises the first lens unit $L_1$ and the second lens unit $L_2$. Accordingly, a magnification of the entire lens system changes based on the condition (1). So, the cam slot on a lens barrel for moving the lens elements are required to be so designed that the image point P' is kept immobile irrespective of the shifting of the first lens unit $L_1$ and the second lens unit $L_2$.

The interference among lens units and various aberration caused by a zooming operation will be effectively suppressed, if the zoom lens system further fulfill the following conditions:

$$-1.67 \leq \beta \leq -0.4 \quad (15)$$

$$-1.2 \leq \frac{f_2}{\sqrt{f_{12H} \cdot f_{12L}}} \leq -0.83 \quad (16)$$

wherein the reference symbols are defined as follows:
$f_{12H}$: a compound focal length of the first and the second lens unit $L_1$ and $L_2$ at the maximum magnification $f_{12L}$: a compound focal length of the first and the second lens units $L_1$ and $L_2$ at the minimum magnification As described above, the image point P' on the image surface A and the object point P of the present embodiment are interchanged compared to the zoom lens system in FIG. 2. Accordingly, the conditions (15) and (16) are determined depending on the conditions (3) and (4). Concerning the condition (15), if the magnification $\beta$ exceeds the lower limit thereof, an interference is liable to occur between the first lens unit $L_1$ and the second lens unit $L_2$ at a lower magnification. On the contrary, if the magnification $\beta$ exceeds the upper limit thereof, an intereference is liable to occur between the second lens unit $L_2$ and the third lens unit $L_3$ at a higher magnification. If the axial distances among the lens units are designed to be adquately lengthened to the extent of inducing no interference, the size of the zoom lens system becomes large. In the present embodiment, the focusing operation is performed by changing the distance between the second lens unit $L_2$ and the third lens unit $L_3$. Therefore, when the distance between the second and the third lens units $L_2$ and $L_3$ is too narrow, a range for focusing operation is undesirably limited. It is therefore desirable to set the magnification $\beta$ of the present embodiment between $-1.67$ and $-0.4$.

The condition (16) is for defining the shifting of the first lens unit $L_1$ and the second lens unit $L_2$.

If the lower limit of the condition (16) is exceeded, at a higher magnification, the second lens unit $L_2$ and the third lens unit $L_3$ are liable to interfere with each other. On the contrary, if the upper limit of the condition (16) is exceeded, at a lower magnification, the first lens unit $L_1$ and the second lens unit $L_2$ are liable to interfere with each other.

Further, if the following equation (17) is fulfilled, at the minimum magnification after a zooming operation, the second lens unit $L_2$ returns to an original position where the second lens unit $L_2$ was placed at the maximum magnification.

$$\frac{f_2}{\sqrt{f_{12H} \cdot f_{12L}}} = -1 \quad (17)$$

If the equation (17) is fulfilled, a compact zoom lens system having a larger focusing range can be realized. In addition, from a viewpoint of compensating various aberrations, it is required to make the shifting amount of the lens units as small as possible. Therefore, if the upper limit or the lower limit of the condition (16) is exceeded, it is difficult to correct aberrations because the shifting amount of the lens units is too large.

Furthermore, a zoom lens system for a limited conjugate distance with more satisfactory performance will be realized, if further fulfills the following conditions:

The zoom lens system is constituted with, from the object side, a first lens unit $L_1$ having a positive refracting power consisting of four lens elements, at least one of the four lens element is a negative meniscus lens; the second lens unit $L_2$ having a negative refracting power consisting of a positive lens and a negative bi-concave lens; and the third lens unit $L_3$ having a positive refracting power consisting of three lens elements. Additionally, the following condition (11) should be fulfilled:

$$-0.4 \leq \frac{r_x + r_y}{r_x - r_y} \leq -3.0 \quad (18)$$

wherein the reference symbols are defined as follows:
$r_x$: a radius of curvature of the object-side surface of the negative meniscus lens included in the first lens unit $L_1$
$r_y$: a radius of curvature of the image-side surface of the negative meniscus lens included in the first lens unit $L_1$.

The condition (18) is directed to a lateral chromatic aberration and a spherical aberration. Concerning the condition (18), if the lower limit is exceeded, a positive lateral chromatic aberration and a negative spherical aberration are largely generated. If the upper limit of the condition (18) is exceeded, a positive spherical aberration is largely generated. Therefore, it is difficult to satisfactorily compensate aberrations unless the conditions (18) is fulfilled.

Figure 5:
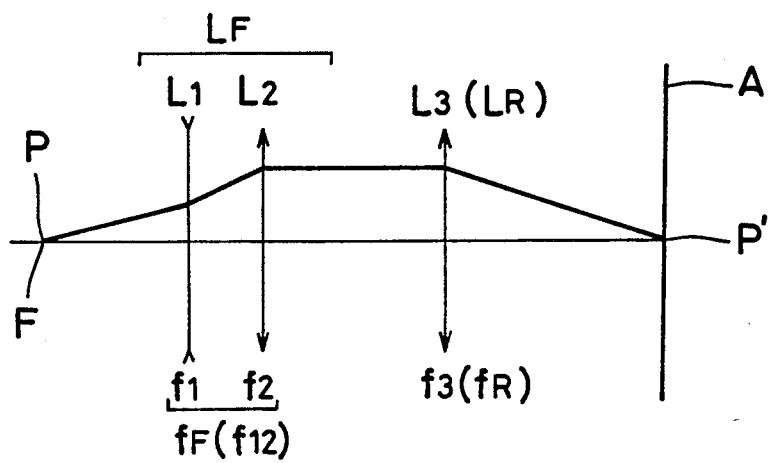
FIG. 5 shows an arrangement of refracting power of a zoom lens system for a limited conjugate distance according to a fourth embodiment of the present invention.

FIG. 5 shows a fifth embodiment of a zoom lens system for a limited conjugate distance in which the zooming operation is performed by using the front lens group $L_F$. The zoom lens system is constituted with, from the object side to the image side, the first lens unit $L_1$ having a negative refracting power, the second lens unit $L_2$ having a positive refracting power and the third lens unit $L_3$ having a positive refrative power.

Concerning the arrangement of the refractive powers, the first lens unit $L_1$ and the second lens unit $L_2$ of the zoom lens system of FIG. 5 are in inverse relationship with those of the zoom lens system of FIG. 4.

As shown in FIG. 5, the focusing operation is performed as follows: the distance between the second lens unit $L_2$ and the third lens unit $L_3$ is varied so that the object point P may coincide with the object focal point F of the front lens group $L_F$. Thereby, an axial luminous flux passed through the second lens unit $L_2$ is in substantially parallel with the optical axis. In this case, the zooming operation is performed by varying the distance between the first lens unit $L_1$ and the second lens unit $L_2$. Thus, once a magnification is determined by the zooming operation, the magnification is kept constant during the focusing operation.

In addition, since the front lens group $L_F$ includes the first lens unit $L_1$ and the second lens unit $L_2$, the focal length $f_F$ of the front lens group $L_F$ is varied in response to change in the distance between the first lens unit $L_1$ and the second lens unit $L_2$. That is, due to a change in the focal length $f_F$, the magnification $\beta$ of the entire zoom lens system is varied according to the equation (1). Further, it is necessary to design a cam slot on a lens barrel so as to maintain the image point P' immobile irrespective of the shifting of the first lens unit $L_1$ and the second lens unit $L_2$.

According to the present embodiment, in order to realize a zoom lens system with a compact size and satisfactory performance, in which interference of each lens unit and a fluctuation of various aberrations coused by a zooming operation can be suppressed, it is preferable to fulfill the following conditions:

$$1.2 \leq \frac{f_{12H}}{f_2} \leq 1.6 \quad (19)$$

wherein $f_{12H}$ represents compound focal length of the first and the second lens units $L_1$ and $L_2$ at the maximum magnification.

If the lower limit of the condition (19) is exceeded, the adequate distance from the object surface of the first lens unit $L_1$ to an object can not be obtained. On the contrary, if the upper limit is exceeded, the focal lengths $f_1$ and $f_2$ relative to the compound focal length $f_{12}$ become smaller. That is, the refracting powers of the second lens unit $L_2$ and the third lens unit $L_3$ are increased, whereby compensating aberrations is made difficult.

It should be noted that the zoom lens system of the present embodiment equals to the zoom lens system shown in FIG. 3 in which the image point P' on the image surface A and the object point P on the object are positionally interchanged, whereby the magnification is limited by the condition (20) considering the interferences among lens components and the like.

When the lens system according to the present embodiment fulfills the following further conditions, it can be obtained a desirable performance.

The optical system is constituted with, from the object side to the image side, a first lens unit $L_1$ having a negative refracting power consisting of three lens elements, at least one lens element of the three is a positive meniscus lens; the second lens unit $L_2$ having a positive refracting power consisting of four lens elements; and the third lens unit $L_3$ having a positive refracting power consisting of three lens elements. Additionally, the following ocndition (21) should be fulfilled.

$$-4.5 \leq \frac{r_a + r_b}{r_a - r_b} \leq -2.5 \quad (21)$$

wherein the reference symbols are defined as follows:
$r_a$: a radius of curvature of the object-side surface of the positive meniscus lens included in the first lens unit $L_1$
$r_b$: a radius of curvature of the image-side surface of the positive meniscus lens included in the first lens unit $L_1$ If the lower limit of the condition (21) is exceeded, a positive spherical aberration is largely generated. On the contrary, if the upper limit of the condition (21) is exceeded, a negative spherical aberration is largely generated. It is therefore difficult to satisfactorily compensate aberrations unless the conditions (21) is fulfilled.

Data will be subsequently described with respect to the embodiments 1 to 4. In the data tables of respective embodiments, f represents a focal length, $F_{NO}$ represents an F number, $r_1, r_2, r_3, \ldots$ are radius of curvature with repsective sub-number indicating the surfaces from the object to image side along the optical axis, $d_1, d_2, d_3, \ldots$ represent the axial distance and includes both air spaces and the actual thickness of lenses along the optical axis, $N_1, N_2, N_3, \ldots$ respresent the indices of refraction of respective lenses and again, the sub-number refer to the particular optical element from the object to image side, and $\nu_1, \nu_2, \nu_3, \ldots$ represent Abbe numbers of respective lenses subsequentially counted from the object side.

Aspherical surfaces in respective embodiments are defined by the following equation when an arbitrary point on the aspherical surface is represented by x, y, z:

$$X = f(\Phi) = \frac{C_o \Phi^2}{1 + \sqrt{1 - \epsilon C_o^2 \Phi^2}} + \Sigma A_i \Phi^i$$

wherein the reference symbols are defined as follows:
X: a shifting amount from the top of the aspherical surface in the direction parallel to the light axis of the aspherical surface
$\Phi$: a distance from the top of the aspherical surface in the direction perpendicular to the light axis of aspherical surface $(=\sqrt{X^2 + Y^2})$
$C_o$: radius of curvature at the top of the aspherical surface
$\epsilon$: a quadratic curved surface parameter
$A_i$: curvature of aspherical surface at i-th degree In addition, when $A_i=0$, the aspherical surface used in the present embodiments depends on only $\epsilon$. However, as known, $\epsilon$ can be developed and replaced with $A_i$, and therefore the generality of the invention is not failed.

Table 5 shows particular values of the respective condition with respect to the embodiments corresponding to Tables 1 to 4, wherein values of the conditions (2), (3), (4), (7), (8) for the embodiment 1, values of the conditions (9), (10), (13), (14) for the embodiment 2, values of the conditions (15), (16), (18) for the embodiment 3 and values of the conditions (19), (20), (21) for the embodiment 4 are shown respectively.

Figure 6:
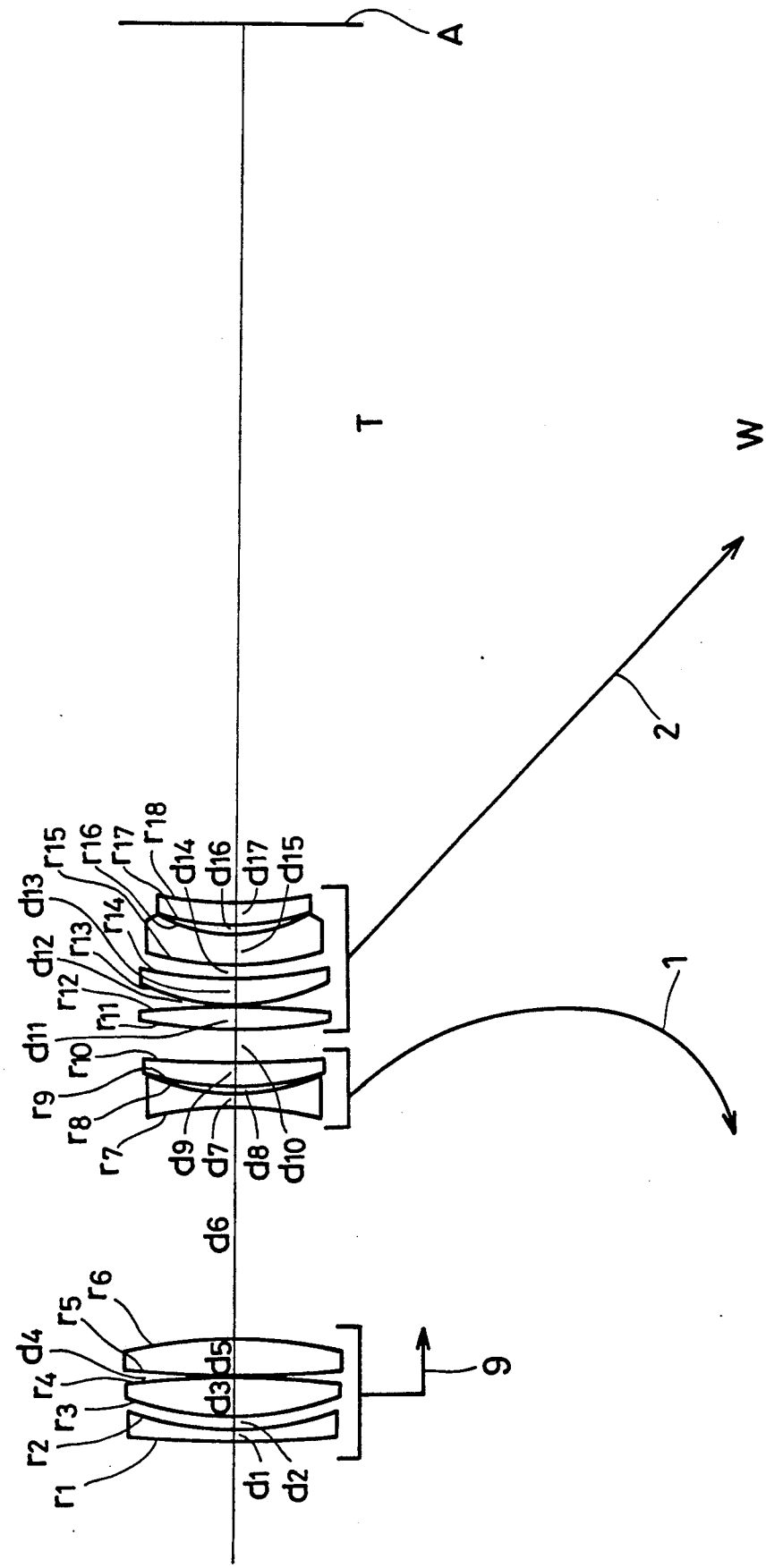
FIG. 6 shows a cross sectional view of a zoom lens system according to the first embodiment of the present invention.
Figure 7:
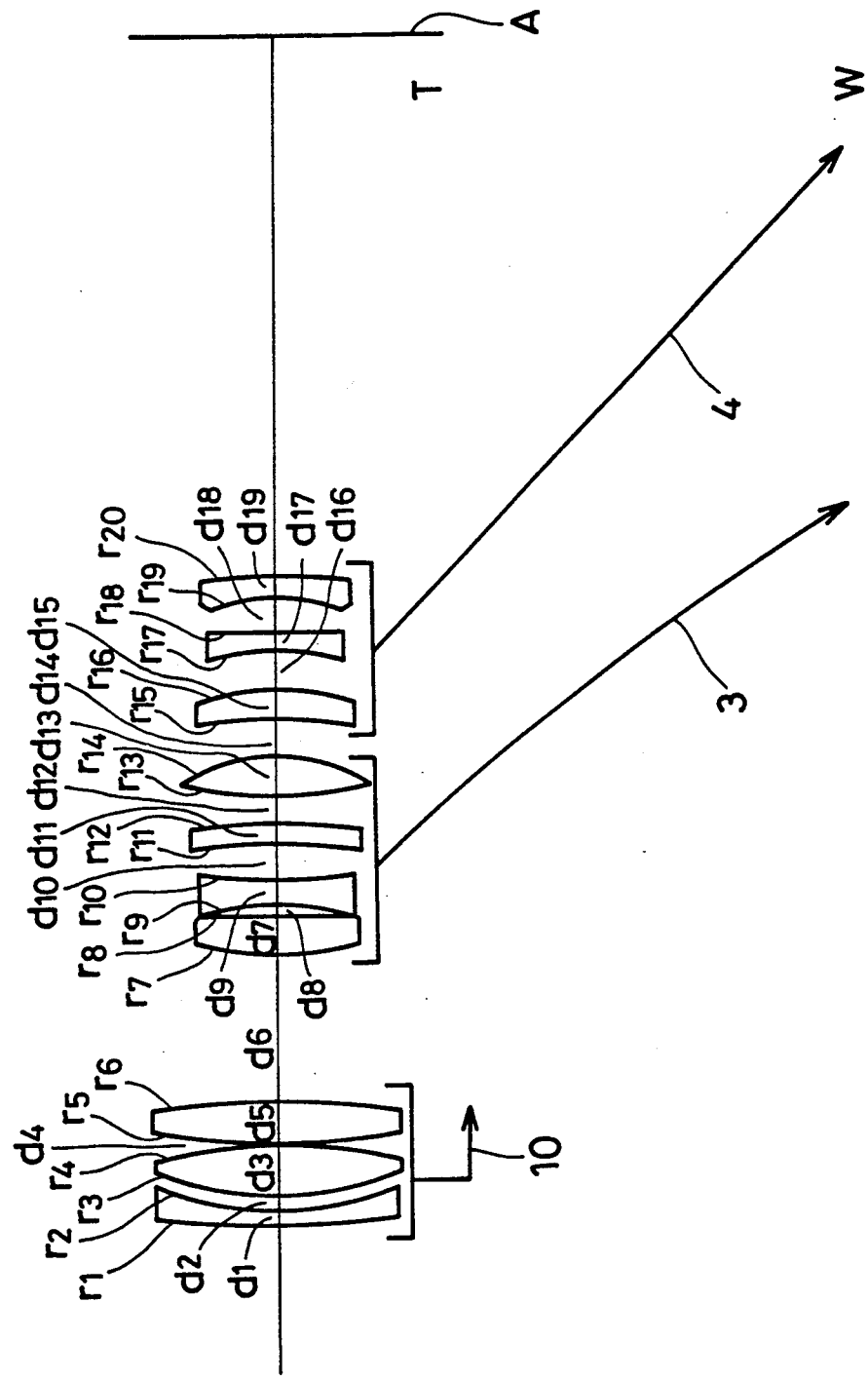
FIG. 7 shows a cross sectional view of a zoom lens system according to the second embodiment of the present invention.
Figure 8:
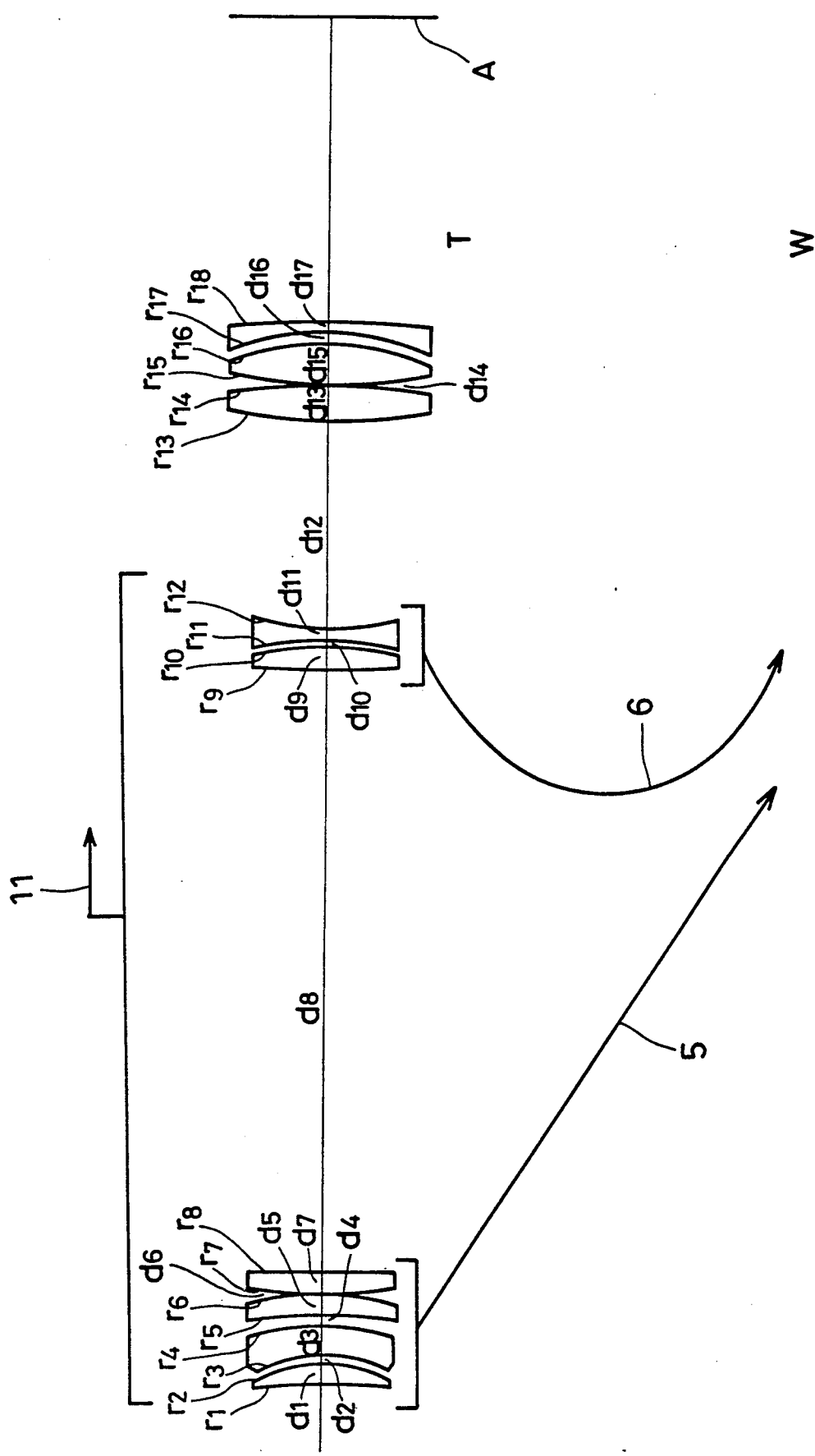
FIG. 8 shows a cross sectional view of a zoom lens system according to the third embodiment of the present invention.

Next, FIGS. 6 to 9 shows schematic configurations at the longest focal length condition in the embodiments 1 to 4 respectively, wherein the moving of the front lens group for focusing are indicated by arrow 9 in FIG. 6, by arrow 10 in FIG. 7, by arrow 11 in FIG. 8, and by arrow 12 in FIG. 9, in addition, the moving of the rear lens group or the front lens group for zooming are indicated by arrows 1 and 2 in FIG. 6, by arrows 3 and 4 in FIG. 7, by arrows 5 and 6 in FIG. 8, by arrows 7 and 8 in FIG. 9.

In each aberration curve of FIGS. 10a and the 10b and the like, the line d shows an aberration with respect to d-line, the dotted line SC shows a sine condition, the dotted line DM shows an astigmatism in a meridional image plane and the line DS shows an astigmatism in a sagital image plane.

TABLE 1

| [Embodiment 1] $\beta = -2.1 \sim -0.6 \quad f = 30.2 \quad F_{NO} = -7.0$ ||||
|---|---|---|---|
| Radius of Curvature | Distance | Refractive Index | Abbe Number |
| $r_1$ 72.000 | | | |
| | $d_1$ 1.000 | $N_1$ 1.84666 | $\nu_1$ 23.82 |
| $r_2$ 24.311 | | | |
| | $d_2$ 1.000 | | |
| $r_3$ 25.169 | | | |
| | $d_3$ 3.200 | $N_2$ 1.51680 | $\nu_2$ 64.20 |
| $r_4$ −68.396 | | | |
| | $d_4$ 0.120 | | |
| $r_5$ 76.939 | | | |
| | $d_5$ 3.000 | $N_3$ 1.51680 | $\nu_3$ 64.20 |
| $r_6$ −33.858 | | | |
| | $d_6$ 18.000 | | |
| $r_7$ −32.474 | | | |
| | $d_7$ 1.000 | $N_4$ 1.67003 | $\nu_4$ 47.15 |
| $r_8$ 22.140 | | | |
| | $d_8$ 0.500 | | |
| $r_9$ 23.953 | | | |
| | $d_9$ 2.000 | $N_5$ 1.75520 | $\nu_5$ 27.15 |
| $r_{10}$ 146.580 | | | |
| | $d_{10}$ 2.500 | | |
| $r_{11}$ 41.112 | | | |
| | $d_{11}$ 1.800 | $N_6$ 1.71300 | $\nu_6$ 53.93 |

TABLE 1-continued

[Embodiment 1]
$\beta = -2.1 \sim -0.6$    $f = 30.2$    $F_{NO} = -7.0$

| Radius of Curvature | Distance | Refractive Index | Abbe Number |
|---|---|---|---|
| $r_{12}$ −104.579 | | | |
| | $d_{12}$ 0.100 | | |
| $r_{13}$ 16.920 | | | |
| | $d_{13}$ 1.930 | $N_7$ 1.67000 | $\nu_7$ 57.07 |
| $r_{14}$ 32.034 | | | |
| | $d_{14}$ 1.000 | | |
| $r_{15}$ 19.500 | | | |
| | $d_{15}$ 2.500 | $N_8$ 1.84666 | $\nu_8$ 23.82 |
| $r_{16}$ 10.872 | | | |
| | $d_{16}$ 0.700 | | |
| $r_{17}$ 14.962 | | | |
| | $d_{17}$ 1.870 | $N_9$ 1.51680 | $\nu_9$ 64.20 |
| $r_{18}$ 28.990 | | | |
| | $\Sigma d = 42.220$ | | |

Power data
$f_1 = 36.0$    $f_2 = -41.667$
$f_{23H} = 75.6$    $f_{23L} = 21.6$
Variable Distance

|  | $\beta = -2.1$ | $\beta = -1.2$ | $\beta = -0.6$ |
|---|---|---|---|
| $d_6$ | 18.000 | 28.099 | 15.731 |
| $d_{10}$ | 2.500 | 13.961 | 40.702 |
| L.B. | 69.092 | 47.533 | 33.160 |

TABLE 2

[Embodiment 2]
$\beta = -1.9 \sim -0.8$    $f = 20.5$    $F_{NO} = -7.0$

| Radius of Curvature | Distance | Refractive Index | Abbe Number |
|---|---|---|---|
| $r_1$ 93.001 | | | |
| | $d_1$ 1.000 | $N_1$ 1.84666 | $\nu_1$ 23.82 |
| $r_2$ 24.012 | | | |
| | $d_2$ 1.000 | | |
| $r_3$ 23.979 | | | |
| | $d_3$ 3.200 | $N_2$ 1.51680 | $\nu_2$ 64.20 |
| $r_4$ −46.969 | | | |
| | $d_4$ 0.120 | | |
| $r_5$ 37.889 | | | |
| | $d_5$ 3.000 | $N_3$ 1.51680 | $\nu_3$ 64.20 |
| $r_6$ −79.669 | | | |
| | $d_6$ 10.000 | | |
| $r_7$ 17.791 | | | |
| | $d_7$ 2.527 | $N_4$ 1.51742 | $\nu_4$ 52.41 |
| $r_8$ 133.192 | | | |
| | $d_8$ 0.800 | | |
| $r_9$ −29.953 | | | |
| | $d_9$ 1.863 | $N_5$ 1.83400 | $\nu_5$ 37.05 |
| $r_{10}$ 37.762 | | | |
| | $d_{10}$ 2.500 | | |
| $r_{11}$* −99.235 | | | |
| | $d_{11}$ 1.342 | $N_6$ 1.58400 | $\nu_6$ 31.00 |
| $r_{12}$ −43.110 | | | |
| | $d_{12}$ 1.769 | | |
| $r_{13}$ 27.858 | | | |
| | $d_{13}$ 2.882 | $N_7$ 1.49310 | $\nu_7$ 83.58 |
| $r_{14}$ −11.446 | | | |
| | $d_{14}$ 2.558 | | |
| $r_{15}$ −28.599 | | | |
| | $d_{15}$ 2.132 | $N_8$ 1.65446 | $\nu_8$ 33.86 |
| $r_{16}$ −14.070 | | | |
| | $d_{16}$ 2.800 | | |
| $r_{17}$ −14.286 | | | |
| | $d_{17}$ 1.184 | $N_9$ 1.71700 | $\nu_9$ 47.86 |
| $r_{18}$ −120.538 | | | |
| | $d_{18}$ 2.600 | | |
| $r_{19}$ −11.478 | | | |
| | $d_{19}$ 1.421 | $N_{10}$ 1.71700 | $\nu_{10}$ 47.86 |
| $r_{20}$ −39.533 | | | |
| | $\Sigma d = 44.698$ | | |

Coefficient of aspherical surface
$r_{11}$: $A_4 = -0.20919 \times 10^{-3}$    $A_6 = -0.20800 \times 10^{-5}$
$A_8 = -0.20000 \times 10^{-7}$    $A_{10} = -0.57300 \times 10^{-9}$
$A_{12} = -0.62801 \times 10^{-11}$ Power data
$f_1 = 36.0$    $f_2 = -20.419$

TABLE 2-continued

[Embodiment 2]
$\beta = -1.9 \sim -0.8$    $f = 20.5$    $F_{NO} = -7.0$

| Radius of Curvature | Distance | Refractive Index | Abbe Number |
|---|---|---|---|

$f_{23H} = 68.4$    $f_{23L} = 28.8$
Variable Distance

|  | $\beta = -1.9$ | $\beta = -1.4$ | $\beta = -0.8$ |
|---|---|---|---|
| $d_6$ | 10.000 | 22.625 | 34.910 |
| $d_{14}$ | 2.558 | 4.295 | 9.246 |
| L.B. | 36.856 | 22.493 | 5.258 |

TABLE 3

[Embodiment 3]
$\beta = -1.67 \sim -0.4$    $f = 198.1$    $F_{NO} = -7.0$

| Radius of Curvature | Distance | Refractive Index | Abbe Number |
|---|---|---|---|
| $r_1$ −49.137 | | | |
| | $d_1$ 1.870 | $N_1$ 1.51680 | $\nu_1$ 64.20 |
| $r_2$ −12.272 | | | |
| | $d_2$ 0.700 | | |
| $r_3$ −12.195 | | | |
| | $d_3$ 2.500 | $N_2$ 1.84666 | $\nu_2$ 23.82 |
| $r_4$ −23.547 | | | |
| | $d_4$ 1.000 | | |
| $r_5$ −50.417 | | | |
| | $d_5$ 1.930 | $N_3$ 1.67000 | $\nu_3$ 57.07 |
| $r_6$ −24.133 | | | |
| | $d_6$ 0.100 | | |
| $r_7$ 63.671 | | | |
| | $d_7$ 1.800 | $N_4$ 1.71300 | $\nu_4$ 53.93 |
| $r_8$ −272.371 | | | |
| | $d_8$ 52.187 | | |
| $r_9$ 126.438 | | | |
| | $d_9$ 2.000 | $N_5$ 1.75520 | $\nu_5$ 27.15 |
| $r_{10}$ −29.829 | | | |
| | $d_{10}$ 0.500 | | |
| $r_{11}$ −29.417 | | | |
| | $d_{11}$ 1.000 | $N_6$ 1.67003 | $\nu_6$ 47.15 |
| $r_{12}$ 20.662 | | | |
| | $d_{12}$ 18.000 | | |
| $r_{13}$ 49.829 | | | |
| | $d_{13}$ 3.000 | $N_7$ 1.51680 | $\nu_7$ 64.20 |
| $r_{14}$ −85.673 | | | |
| | $d_{14}$ 0.120 | | |
| $r_{15}$ 39.994 | | | |
| | $d_{15}$ 3.700 | $N_8$ 1.51680 | $\nu_8$ 64.20 |
| $r_{16}$ −22.776 | | | |
| | $d_{16}$ 1.000 | | |
| $r_{17}$ −23.672 | | | |
| | $d_{17}$ 1.000 | $N_9$ 1.84666 | $\nu_9$ 23.82 |
| $r_{18}$ −80.110 | | | |
| | $\Sigma d = 92.407$ | | |

Power data
$f_2 = -44.091$    $f_3 = 36$
$f_{23H} = 21.6$    $f_{23L} = 90.0$
Variable Distance

|  | $\beta = -1.67$ | $\beta = -0.67$ | $\beta = -0.4$ |
|---|---|---|---|
| $d_8$ | 52.187 | 12.292 | 1.653 |
| $d_{12}$ | 18.000 | 33.958 | 18.000 |

TABLE 4

[Embodiment 4]
$\beta = -1.25 \sim -0.6$    $f = 25.6$    $F_{NO} = -7.0$

| Radius of Curvature | Distance | Refractive Index | Abbe Number |
|---|---|---|---|
| $r_1$ 22.996 | | | |
| | $d_1$ 1.421 | $N_1$ 1.71700 | $\nu_1$ 47.86 |
| $r_2$ 11.336 | | | |
| | $d_2$ 2.500 | | |
| $r_3$ 91.467 | | | |
| | $d_3$ 1.184 | $N_2$ 1.71700 | $\nu_2$ 47.86 |
| $r_4$ 13.911 | | | |
| | $d_4$ 2.500 | | |
| $r_5$ 13.605 | | | |
| | $d_5$ 2.132 | $N_3$ 1.65446 | $\nu_3$ 33.86 |

TABLE 4-continued

[Embodiment 4]
$\beta = -1.25 \sim -0.6$    $f = 25.6$    $F_{NO} = -7.0$

| Radius of Curvature | Distance | Refractive Index | Abbe Number |
|---|---|---|---|
| $r_6$ 23.405 | | | |
| | $d_6$ 9.400 | | |
| $r_7$ 11.398 | | | |
| | $d_7$ 2.882 | $N_4$ 1.49310 | $\nu_4$ 83.58 |
| $r_8$ −31.388 | | | |
| | $d_8$ 1.769 | | |
| $r_9$ 44.532 | | | |
| | $d_9$ 2.500 | $N_5$ 1.58400 | $\nu_5$ 31.00 |
| $r_{10}$ 91.140 | | | |
| | $d_{10}$ 2.000 | | |
| $r_{11}$ −33.272 | | | |
| | $d_{11}$ 1.863 | $N_6$ 1.83400 | $\nu_6$ 37.05 |
| $r_{12}$ 30.531 | | | |
| | $d_{12}$ 0.553 | | |
| $r_{13}$ −177.983 | | | |
| | $d_{13}$ 2.527 | $N_7$ 1.51742 | $\nu_7$ 52.41 |
| $r_{14}$ −15.058 | | | |
| | $d_{14}$ 35.000 | | |
| $r_{15}$ 81.786 | | | |
| | $d_{15}$ 3.000 | $N_8$ 1.51680 | $\nu_8$ 64.20 |
| $r_{16}$ −39.390 | | | |
| | $d_{16}$ 0.120 | | |
| $r_{17}$ 46.028 | | | |
| | $d_{17}$ 3.200 | $N_9$ 1.51680 | $\nu_9$ 64.20 |
| $r_{18}$ −23.423 | | | |
| | $d_{16}$ 1.000 | | |
| $r_{19}$ −24.000 | | | |
| | $d_{19}$ 1.000 | $N_{10}$ 1.84666 | $\nu_{10}$ 23.82 |
| $r_{20}$ −93.001 | | | |

$\Sigma d = 76.551$

Coefficient of aspherical surface
$r_{10}$: $A_4 = 0.20919 \times 10^{-3}$    $A_6 = 0.20800 \times 10^{-5}$
$A_8 = 0.20000 \times 10^{-7}$    $A_{10} = -0.57300 \times 10^{-9}$
$A_{12} = 0.62801 \times 10^{-11}$ Power data
$f_2 = -20.419$    $f_3 = 36.0$
$f_{12H} = 28.8$    $f_{12L} = 60.0$ Variable Distance

| $\beta = -1.25$ | $\beta = -1.0$ | $\beta = -0.6$ |
|---|---|---|
| $d_6$ 9.400 | 6.693 | 2.361 |
| $d_{14}$ 35.000 | 30.975 | 12.867 |

TABLE 5

| embo. 1 | $\beta$ | $\dfrac{f_2}{\sqrt{f_{23H} \cdot f_{23L}}}$ | $\dfrac{r_2}{r_1}$ | $\dfrac{r_{15} + r_{16}}{r_{15} - r_{16}}$ |
|---|---|---|---|---|
| | $-2.1 \sim -0.6$ | −1.03 | 0.34 | 3.52 |
| embo. 2 | $\beta$ | $\dfrac{f_{23L}}{f_2}$ | $\dfrac{r_2}{r_1}$ | $\dfrac{r_{15} + r_{16}}{r_{15} - r_{16}}$ |
| | $-1.9 \sim -0.8$ | 1.41 | 0.26 | 3.00 |
| embo. 3 | $\beta$ | $\dfrac{f_2}{\sqrt{f_{12H} \cdot f_{12L}}}$ | $\dfrac{r_3 + r_4}{r_3 - r_4}$ | |
| | $-1.67 \sim -0.4$ | −1.00 | −3.15 | |
| embo. 4 | $\beta$ | $\dfrac{f_{12H}}{f_2}$ | $\dfrac{r_5 + r_6}{r_5 - r_6}$ | |
| | $-1.25 \sim -0.6$ | 1.41 | −3.78 | |

What is claimed is:

1. A zoom lens system for a limited conjugate distance comprising, from an object side to an image side; a front lens group and a rear lens group, both of which have a positive refractive power and one of which consists of two lens units, wherein a focusing operation is performed by moving the front lens group and a zooming operation is performed by varying the distance between said two lens units, the zoom lens system fulfills the following condition:

$$l = m$$

wherein l represents an object focal length of the front lens group, and m represents an axial distance between an object point and an object principal point of the front lens group.

2. A zoom lens system according to claim 1, wherein the front lens group includes a first lens unit having a positive refracting power, and the rear lens group includes a second lens unit and a third lens, one of said second and third lens units having a positive refracting power and the other having a negative refracting power.

3. A zoom lens system according to claim 2, wherein the second lens unit has a negative refracting power, and the third lens unit has a positive refracting power.

4. A zoom lens system according to claim 3, which fulfills the following conditions:

$$-2.5 \leq \beta \leq -0.6$$

$$-1.2 \leq \frac{f_2}{\sqrt{f_{23H} \cdot f_{23L}}} \leq -0.8$$

wherein,
$\beta$ represents a magnification of the entire zoom lens system;
$f_2$ represents a focal length of the second lens unit;
$f_{23H}$ represents a compound focal length of the second and the third lens units at a miximum magnification; and
$f_{23L}$ represents a compound focal length of the second and the third lens units at a minimum magnification.

5. A zoom lens system according to claim 4, wherein the first lens unit includes three lens elements, at least one of which is a negative lens; the second lens unit includes a negative bi-concave lens element and a positive lens element; the third lens unit includes four lens elements, one of which is a negative meniscus lens.

6. A zoom lens system according to claim 5, which fulfills the following conditions;

$$0.25 \leq \frac{r_q}{r_p} \leq 0.35$$

$$3.0 \leq \frac{r_S + r_T}{r_S - r_T} \leq 4.0$$

wherein,
$r_p$ represents a radius of curvature of an object-side surface of the negative lens included in the first lens unit;
$r_q$ represents a radius of curvature of an image-side surface of the negative lens included in the first lens unit;
$r_S$ represents a radius of curvature of an object-side surface of the negative meniscus lens included in the third lens unit; and
$r_T$ represents a radius of curvature of an image-side surface of the negative meniscus lens included in the third lens unit.

7. A zoom lens system according to claim 2, wherein the second lens unit has a positive refracting power, and the third lens unit has a negative refracting power.

8. A zoom lens system according to claim 7, which fulfills the following conditions:

$$1.2 \leq \frac{f_{23L}}{f_Z} \leq 1.6$$

$$-1.9 \leq \beta \leq -0.8$$

wherein,
$\beta$ represents a magnification of the zoom lens system;
$f_{23L}$ represents a compound focal length of the second and the third lens units at the minimum magnification; and
$f_2$ represents a focal length of the second lens unit.

9. A zoom lens system according to claim 8, wherein the first lens unit includes three lens elements, one of which is a negative lens, the second lens unit includes four lens elements, and the third lens unit includes three lens elements, at least one of which is a positive meniscus lens element.

10. A zoom lens system according to claim 9, which fulfill the following conditions:

$$0.25 \leq \frac{r_a}{r_p} \leq 0.35$$

$$2.5 \leq \frac{r_S + r_T}{r_S - r_T} \leq 4.5$$

wherein,
$r_p$ represents a radius of curvature of an object-side surface of the negative lens included in the first lens unit;
$r_q$ represents a radius of curvature of the image-side surface of the negative lens included in the first lens unit;
$r_S$ represents a radius of curvature of an object-side surface of the negative meniscus lens included in the third lens unit; and
$r_T$ represents a radius of curvature of an image-side surface of the negative meniscus lens included in the third lens unit.

11. A zoom lens system according to claim 1, wherein the front lens group includes a first lens unit and a second lens unit, one of said second and third lens units having a positive refracting power and the other having a negative refracting power, and the rear lens group includes a third lens unit having a positive refracting power.

12. A zoom lens system according to claim 11, wherein the first lens unit having a positive refracting power, and the second lens unit having a negative refracting power.

13. A zoom lens system according to claim 12, which fulfills the following conditions:
$$1.67 \leq \beta \leq -0.4$$

$$-1.20 \leq \frac{f_2}{\sqrt{f_{12H} \cdot f_{12L}}} \leq -0.83$$

wherein,
$\beta$ represents a magnification of the zoom lens system;
$f_2$ represents a focal length of the second lens unit;
$f_{12H}$ represents a compound focal length of the first and the second lens units at the maximum magnification; and
$f_{12L}$ represents a compound focal length of the first and the second lens units at the minimum magnification.

14. A zoom lens system according to claim 13, wherein the first lens unit includes four lens elements, one of which is a negative meniscus lens, the second lens unit includes a positive lens element and a negative bi-concave lens element, and the third lens unit includes three lens elements.

15. A zoom lens system according to claim 14, which fulfills the following conditions:

$$-0.4 \leq \frac{r_x + r_y}{r_x - r_y} \leq -3.0$$

wherein,
$r_x$ represents a radius of curature of an object-side surface of the negative meniscus lens included in the first lens unit; and
$r_y$ represents a radius of curvature of an image-side surface of the negative meniscus lens included in the first lens unit.

16. A zoom lens system according to claim 11, wherein the first lens unit has a negative refracting power, and the second lens unit has a positive refracting power.

17. A zoom lens system according to claim 16, which fulfills the following conditions:

$$1.2 \leq \frac{f_{12H}}{f_2} \leq 1.6$$

$$-1.25 \leq \beta \leq -0.53$$

wherein,
$f_2$ represents a focal length of the second lens unit;
$f_{12H}$ represents a compound focal length of the first and the second lens unit at the maximum magnification; and
$\beta$ represents the magnification of the entire lens system.

18. A zoom lens system according to claim 17, wherein the first lens unit includes three lens elements, one of which is a positive meniscus lens, the second lens unit includes four lens elements, and the third lens unit includes three lens elements.

19. A zoom lens system according to claim 18, which fulfills the following condition:

$$-4.5 \leq \frac{r_a + r_b}{r_a - r_b} \leq -2.5$$

wherein,
$r_a$ represents a radius of curvature of an object-side surface of the positive meniscus lens included in the first lens unit; and
$r_b$ represents a radius of curvature of an image-side surface of the positive meniscus lens included in the first lens unit.

20. A zoom lens system for a limited conjugate distance comprising, from an object side to an image side; a front lens group and a rear lens group, both of which have a positive refractive power and one of which consists of two lens units, wherein a focusing operation is performed by moving the front lens group so that axial luminous flux, projected from the front lens group is substantially parallel to an optical axis, and wherein a zooming operation is performed by varying the distance between said two lens units.

* * * * *